T. F. HAGERTY, DEC'D.
G. I. HAGERTY, ADMINISTRATRIX.
SELF LOADING DUMP CART.
APPLICATION FILED OCT. 2, 1914.

1,185,658.

Patented June 6, 1916.

Inventor
T. F. Hagerty
By Victor J. Evans
Attorney

UNITED STATES PATENT OFFICE.

THOMAS F. HAGERTY, OF NEW YORK, N. Y.; GEORGIANA I. HAGERTY, OF JERSEY CITY, NEW JERSEY, ADMINISTRATRIX OF SAID THOMAS F. HAGERTY, DECEASED.

SELF-LOADING DUMP-CART.

1,185,658.  Specification of Letters Patent.  Patented June 6, 1916.

Application filed October 2, 1914. Serial No. 864,683.

*To all whom it may concern:*

Be it known that I, THOMAS F. HAGERTY, a citizen of the United States, residing at New York, in the county of New York and State of New York, have invented new and useful Improvements in Self-Loading Dump-Carts, of which the following is a specification.

This invention relates to self-loading carts or vehicles of that class which accumulate a load by scraping up material in front of the wheels, the load being discharged in the rear by gravity.

One object of the invention is to produce a skeleton body, the sides of which are connected together and spaced apart by the axle and also by an angular front piece which also provides a seat support.

A further object of the invention is to produce a vehicle of the class described having an apron or scraper which is pivotally connected with the axle.

A further object of the invention is to produce a vehicle of the character described having a tail board which is supported to swing upward and rearward under the impact of the gravity of the load so as to afford clearance for the load in discharging.

A further object of the invention is to provide simple self-latching means for the tail board when the latter returns by gravity to its initial or obstructing position.

A further object of the invention is to provide means for elevating the free end of the scraper, when loaded, so as to close the inlet of the cart.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

Figure 1:
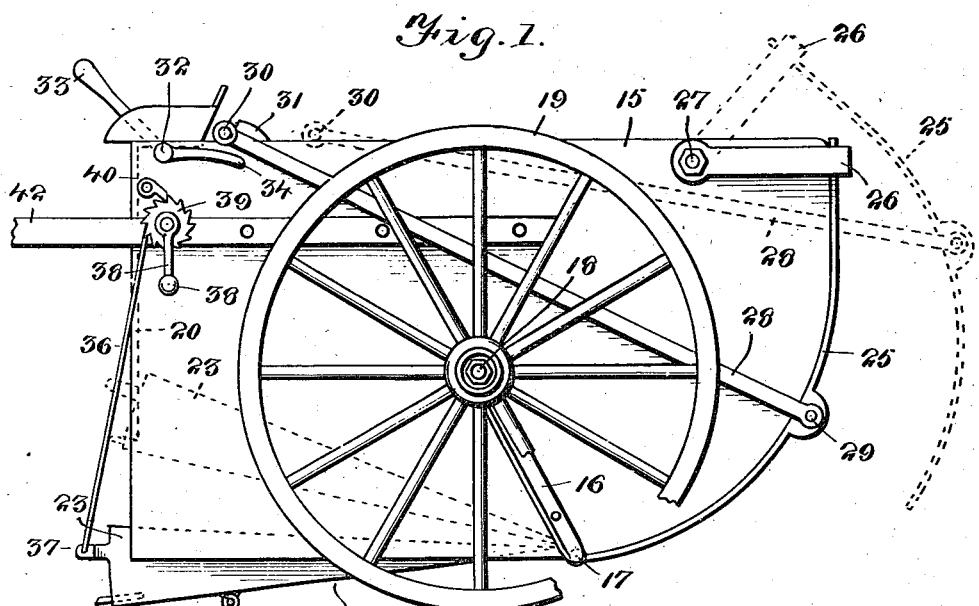
Figure 2:
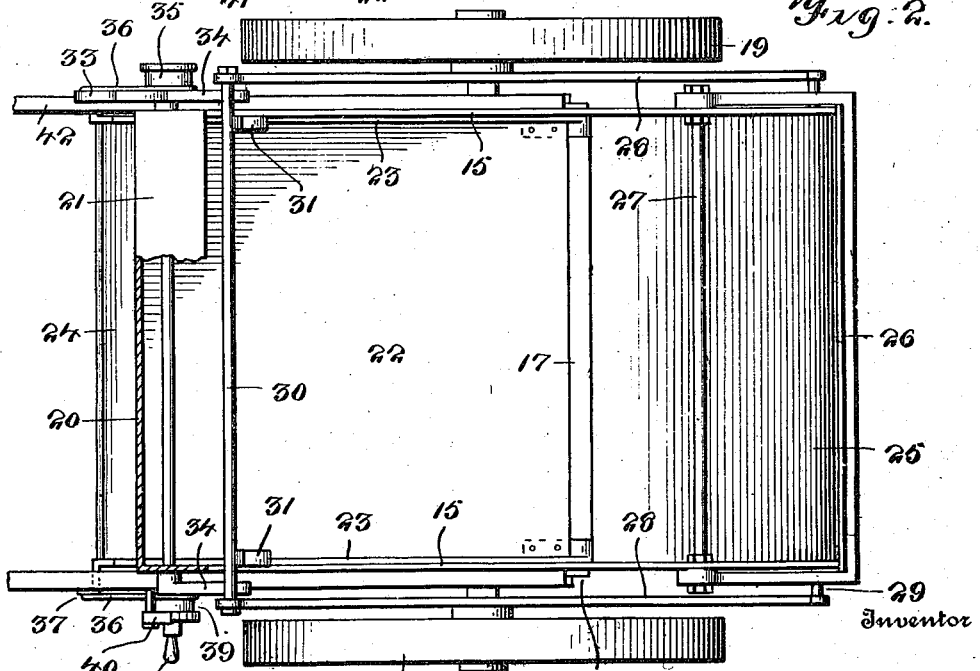

In the drawing,—Figure 1 is a side elevation partly in section of a cart constructed in accordance with the invention. Fig. 2 is a top plan view of the same.

Corresponding parts in both figures of the drawing are denoted by like characters of reference.

The side members 15 of the box or body of the improved cart are secured on the limbs 16 of a drop-arch axle, the bridge piece of which is represented at 17 and the spindles at 18, said spindles carrying the wheels 19. The side members are spaced apart and connected at their front ends by a front piece 20 which is of angular form, the top portion thereof forming a seat support 21. Pivoted on the bridge piece 17 is a bottom member which constitutes a scraper 22 operating between the side pieces 15, said scraper being provided with side flanges 23, and said scraper being also preferably provided at its front edge with a blade 24 which may be readily renewed when worn. The side members 15 are rounded at their rear ends, and the opening between said side members is adapted to be obstructed by a curved tail board 25 carried by a yoke 26, the limbs of which are pivoted on a cross bar 27 which connects the side members near the upper edges thereof and in advance of their rear edges as shown. The tail board being thus supported when closed abuts on the bridge piece 17 of the axle, and it is capable of bodily swinging upward and rearward, as seen in dotted lines in Fig. 1. Owing to the curved shape of the tail board, the lower portion of the same may be described as extending forwardly so as to constitute a portion of the bottom of the box or receptacle. It will also be seen that the lower forward portion or edge of said curved tail board abuts on the bridge piece of the axle on which the scraper 22 is pivoted. Hence, when the pivoted scraper is actuated to throw its contents back, the dirt and scrapings will fall directly on the forward curved portion of the tail board which will be eventually subjected to the weight of the accumulated dirt, causing said tail board to swing easily to a discharging position when released. For the purpose of retaining or latching the tail board in a closed position arms 28 are provided, said arms being swingingly connected with the tail board at 29. The forward ends of the arms 28 are connected together by a cross bar 30 which is adapted to engage inclined studs or lugs 31 at the upper edges of the side members, it being evident that when the cross bar drops in front of said lugs the tail board will be latched in a closed position. For the purpose of unlatching a rock shaft 32 is provided having a handle 33 whereby it may be rocked and a rearwardly extending tongue or tongues 34 which by pressing upwardly against the cross bar 30 will throw the latter clear of the lugs 31.

Means are provided whereby the scraper 22 may be lifted to the position shown in dotted lines in Fig. 1, so as to obstruct the opening between the front ends of the side members 15 below the front plate 20. Said means have been shown as consisting of a windlass or drum shaft 35 having connected therewith one end of a flexible element 36, the other end of which is connected with the forward end of the scraper at 37. The flexible element may, of course, be duplicated at each side of the device. The drum shaft has a crank 38 whereby it may be rotated, and it is also provided with a ratchet wheel 39 engaged by a pawl 40 to prevent reverse movement. Any other well known and convenient means may be adopted for raising and adjusting the scraper. The latter has also been shown provided with a ground-engaging roller or wheel 41 whereby the edge of the scraper may be kept clear of the ground when desired. Thills or shafts 42 for the attachment of draft have been shown attached to the external faces of the side members of the box.

The box or body of the improved cart or vehicle may be inexpensively but durably constructed of sheet metal, and the entire device may be produced at a very moderate expense. It will be found extremely convenient during the winter season for gathering and disposing of snow, while at other times it will be found equally useful for the collection of dry garbage or street sweepings, especially when collected together in mounds. By drawing the vehicle over the street that is to be cleaned with the scraper in its lowered position the material to be gathered will slide up the incline and accumulate in the box or receptacle. When a load has been collected the scraper may be raised to the obstructing position shown in Fig. 1, when, if necessary, the load may be completed or supplemented by shoveling. The load, having been conveyed to the dumping place, may be discharged by simply releasing the latch bar 30 from engagement with the lugs 31 when, by the weight of the load, the tail gate will be thrown open, and the load will quickly be discharged over the bottom member or scraper 22 which is now presented in a downwardly and rearwardly inclined position. Immediately upon the discharge of the load the tail gate will be restored by gravity to its closed position, and the latch bar will ride over the inclined lugs 31 which will thus be automatically engaged to latch the gate.

It will be noticed that the operation of discharging the load is performed without tilting the body which is non-tiltable, being secured on one hand to the limbs of the axle and on the other hand to draft thills or shafts which latter are connected with the harness of the draft animal. The only operation needed to discharge the load is that of releasing the tail gate, which latter will gravitationally swing wide open, after which the load will be discharged gravitationally over the inclined plane of the bottom member or scraper 22.

The latch bar 30 which extends across the top of the box or body skeleton connects together the latch arms 28 which extend rearwardly along the sides of said body, thereby serving to prevent the side members 15 from bulging or expanding outwardly under the pressure of the load. When dry garbage is gathered the load capacity may be increased by omitting to raise the scraper to an elevated position, but when the device is used for gathering snow the movement of the scraper to an obstructing position at the front end of the box is an important and valuable feature.

Having thus described the invention, what is claimed as new, is—

1. In a vehicle of the class described, a drop-arch axle having supporting wheels, a box including side members secured on the limbs of the axle and a front piece spacing and connecting said side members, a bottom member constituting a scraper pivoted on the bridge piece of the axle, and a swingingly supported tail gate abutting on the bridge piece of the axle, the top portion of the tail gate being supported materially to the rearward of the axle whereby said tail gate will be positioned, when closed, to directly support a considerable portion of the load.

2. A vehicle of the class described including a drop-arch axle having supporting wheels, side members having rounded rear ends and secured on the limbs of the axle, a bottom member constituting a scraper pivoted on the bridge piece of the axle, a yoke pivoted on the side members, a curved tail gate carried by the yoke and abutting, when closed, on the bridge piece of the axle, means for manipulating the bottom member to present it in scraping and in discharging positions, and means for manipulating the tail gate to swing the latter clear of the box, enabling the contents to be discharged without tilting the box.

3. In a vehicle of the class described, a drop-arch axle having supporting wheels, side members having rounded rear ends and secured on the limbs of the axle, a yoke pivoted on the side members, a curved tail gate carried by the yoke and abutting on the bridge piece of the axle, a scraper pivoted on the bridge piece of the axle, and means for swinging the scraper to an inclined position, thereby throwing a large proportion of the weight of the load on the tail gate.

4. In a vehicle of the class described, a drop-arch axle having supporting wheels, side members secured on the limbs of the axle, a yoke pivoted on the side members, a tail gate carried by the yoke and abutting with its lower edge on the bridge piece of the axle, the top portion of said tail gate being supported materially to the rearward of the axle whereby said tail gate is enabled to gravitate clear to the rearward of the side members, latch means to secure the tail gate in a closed position, a scraper pivoted on the bridge piece of the axle, and means for elevating the forward end of the scraper and for supporting the same in a raised position.

5. In a vehicle of the class described, a drop-arch axle having supporting wheels, side members secured on the limbs of the axle, a yoke pivoted on the side members, a tail gate carried by the yoke and abutting on the bridge piece of the axle, arms swingingly connected with the tail gate and extending forwardly externally of the side members, a cross bar connecting said arms, and inclined latch lugs carried by the side members and engaged by the cross bar.

6. In a vehicle of the class described, a drop-arch axle having supporting wheels, side members secured on the limbs of the axle, a yoke pivoted on the side members, a tail gate carried by the yoke and abutting on the bridge piece of the axle, arms swingingly connected with the tail gate and extending forwardly externally of the side members, a cross bar connecting said arms, and inclined latch lugs carried by the side members and engaged by the cross bar, in combination with a scraper pivoted on the bridge piece of the axle, and means for tilting upwardly the front end of said scraper and for supporting it in a raised position.

7. In a vehicle of the class described, a drop-arch axle having supporting wheels, side members secured on the limbs of the axle, a yoke pivoted on the side members, a tail gate carried by the yoke and abutting on the bridge piece of the axle, arms swingingly connected with the tail gate and extending forwardly externally of the side members, a cross bar connecting said arms, and inclined latch lugs carried by the side members and engaged by the cross bar, and means for lifting the cross bar clear of the latch lugs.

8. A vehicle of the class described comprising a drop-arch axle having supporting wheels, a box including side members secured on the limbs of the axle, and a front plate, a bottom member constituting a scraper pivoted on the bridge piece of the axle and operating between the side members of the box, means for lifting the free end of the scraper to obstruct the opening between the side members and below the front plate, a swingingly supported curved tail gate abutting on the bridge piece of the axle, and directly supporting a large portion of the load, and latch means for securing said tail gate in a closed position.

In testimony whereof I affix my signature in presence of two witnesses.

THOMAS F. HAGERTY.

Witnesses:
WM. BAGGER,
BENNETT S. JONES.